United States Patent

Derango et al.

Patent Number: 6,137,796
Date of Patent: *Oct. 24, 2000

[54] PACKET NON-REPLICATING COMPARATOR DEVICE FOR DIGITAL SIMULCAST PACKET DISTRIBUTION

[75] Inventors: Mario Frank Derango, Wauconda; Gregory Allan Dertz, Algonquin, both of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/671,151

[22] Filed: Jun. 28, 1996

[51] Int. Cl.[7] .............................. H04L 12/28; H04L 12/56
[52] U.S. Cl. ...................................... 370/389; 370/390
[58] Field of Search .................... 370/253, 328, 370/338, 389, 390, 312, 432, 331, 327, 350, 232, 233, 234, 252, 254, 257, 347, 351, 356, 359, 360, 392, 396, 398, 437; 455/503

[56] References Cited

U.S. PATENT DOCUMENTS

| | | | |
|---|---|---|---|
| 4,013,962 | 3/1977 | Beseke et al. | 455/135 |
| 4,964,121 | 10/1990 | Moore | 370/350 |
| 5,020,052 | 5/1991 | DePrycker | 370/389 |
| 5,103,444 | 4/1992 | Leung et al. | 370/432 |
| 5,113,413 | 5/1992 | Brown et al. | 375/267 |
| 5,361,398 | 11/1994 | Christian et al. | 455/503 |
| 5,369,682 | 11/1994 | Witsaman et al. | 455/503 |
| 5,414,694 | 5/1995 | Crayford et al. | 370/389 |
| 5,416,770 | 5/1995 | Stoner et al. | 370/312 |
| 5,477,539 | 12/1995 | Brown | 370/312 |
| 5,483,671 | 1/1996 | Helm et al. | 370/312 |
| 5,485,632 | 1/1996 | Ng et al. | 455/503 |
| 5,530,693 | 6/1996 | Averbuch et al. | 370/331 |
| 5,530,915 | 6/1996 | Shaughnessy et al. | 455/503 |
| 5,539,882 | 7/1996 | Gopal et al. | 370/449 |
| 5,542,119 | 7/1996 | Grube et al. | 455/503 |
| 5,550,816 | 8/1996 | Hardwick et al. | 370/397 |
| 5,566,181 | 10/1996 | Huang et al. | 370/390 |
| 5,574,972 | 11/1996 | Hulbert | 370/338 |
| 5,577,032 | 11/1996 | Sone et al. | 370/390 |
| 5,583,913 | 12/1996 | Taketsugu | 370/389 |
| 5,592,486 | 1/1997 | Lo et al. | 370/389 |
| 5,594,761 | 1/1997 | Brown | 375/359 |
| 5,644,599 | 7/1997 | Hess | 455/135 |
| 5,737,322 | 4/1998 | Burbidge et al. | 370/311 |
| 5,745,840 | 4/1998 | Gordon | 375/229 |
| 5,781,547 | 7/1998 | Wilson | 370/395 |
| 5,790,605 | 8/1998 | Helm et al. | 455/133 |
| 5,793,382 | 8/1998 | Yerazunis et al. | 345/474 |
| 5,799,022 | 8/1998 | Williams | 714/797 |
| 5,842,134 | 11/1998 | Brown et al. | 370/529 |
| 5,850,611 | 12/1998 | Krebs | 455/518 |

*Primary Examiner*—Dang Ton
*Assistant Examiner*—Phirin Sam
*Attorney, Agent, or Firm*—Steven R. Santema

[57] ABSTRACT

A packet non-replicating comparator device for use in a digital simulcast radio communication system generates a single seed copy of a timestamped information data packet (per channel) for transmission to either a multicast capable packet-switched network or to a packet duplicator coupled to a unicast capable packet-switched network. The multicast capability of packet-switched networks is utilized to simplify the hardware and software complexity at the comparator site, by assigning the responsibility for performing simulcast (timestamped) packet replication and distribution (to the appropriate transmitters) to the coupled packet-switched network. As a result, the elimination of the comparator performed function of sourcing multiple (replicated) packets of a seed copy frees up valuable link bandwidth and improves processing capability and makes possible the generation of multiple non-replicated packets corresponding to associated ones of multiple channels by a single comparator device.

19 Claims, 2 Drawing Sheets

PACKET NON-REPLICATING COMPARATOR DEVICE FOR DIGITAL SIMULCAST PACKET DISTRIBUTION

FIELD OF THE INVENTION

The present invention relates generally to communication systems and, in particular, to distributing timestamped packets in a digital simulcast system.

BACKGROUND OF THE INVENTION

Multiple site communication systems which comprise a plurality of repeaters and transceivers that are distributed throughout a large geographic region are well known. Many multi-site systems use same-frequency simulcast, i.e., the same communication channel (or carrier frequency) is used by multiple sites throughout the region to simultaneously relay communications to subscriber communication units that are located throughout the multi-site system. This is an efficient frequency reuse technique when the subscribers are routinely located throughout the multi-site system.

The use of comparators, and their associated voting algorithms, within simulcast communication systems is known. In general, a comparator, operably coupled to a plurality of base stations or satellite receivers located in geographically diverse areas, attempts to select or construct a favorable representation of an audio signal given multiple sources of the signal (e.g., the base stations). This is accomplished by comparing the signals received from the signal sources and selecting, from amongst all of the signal sources, portions of the signal having the best signal quality. The selected portions are then reassembled to produce a favorable voted signal frame. The voted signal frame can then be retransmitted by a base station, thereby increasing the probability of good reception (i.e., intelligibly decoded audio) at the signal destination (e.g., a mobile communication device). The signal selected as the best by the comparator is typically distributed therefrom to the transceiver sites for simultaneous re-transmission.

More recently, digital simulcast radio communication systems have been developed. In such systems, digital information is formatted into information frames. Each information frame is made up of a plurality of information packets that are transported through the system infrastructure.

All simulcasted information packets are processed through a comparator which receives inputs from multiple signal sources and selects an input signal source based on predetermined criteria of signal quality. The comparator then assigns a launch time (launch timestamp) to each information packet received from the selected input signal source, and transmits the information packet over an infrastructure link to at least one of a plurality of base stations, where the information packet is temporarily stored in a buffer. Error correcting information is added to the information packet, and at the assigned launch time the resulting data packet is transmitted by the base stations.

Simulcast systems which employ launch timestamps require that exact replicas of the timestamped information data packets be distributed from the timestamping device to each of the simulcast transmitters associated with a given radio channel. This distribution presently requires that the comparator make multiple copies of each timestamped data packet. This requires packet replication capability in the comparator achieved with additional hardware and/or software processing. This packet replication process makes impractical any attempt to configure the comparator to individually support multiple simulcast channels simultaneously. Because packet replication necessarily requires a comparator to source (generate) multiple copies, the aggregate bandwidth demands of the comparator site can become overwhelming, and in most cases it is impossible to efficiently support too many transmitters, or too support more than one channel simultaneously, using a single comparator.

In a conventional, dedicated single-simulcast-channel comparator implementation as shown in FIG. 1, a single comparator 5 is assigned to perform packet replication for a given channel. Comparator 5 comprises a separate hardware controller card 6 which provides a time division multiplexed (TDM) bus 9 which is used to connect a controller card (which creates the seed copy of the timestamped packet) to one or more of the transmitter wireline interface cards 7, 8. The wireline interface cards 7,8 each provide a link interface to two transmitters 10, 11, 12, 13 on the channel. The TDM bus 9 can be used to make a single copy for each interface card (by each card reading the same slot) and then each card makes a second copy via a software process to support the second transmitter interfaced to that card. Conventional comparators utilize independent serial data connections to each transmitter 10, 11, 12, 13 associated with the simulcast channel. One copy is sent over each of these serial data connections for delivery to each simulcast transmitter.

Thus, while the prior art suffices in making the necessary packet replications, such processing significantly reduces processing efficiency at the comparator site since packet replication requires additional hardware and software processing and requires the comparator to source each of the transmitters associated with a given channel with independent serial (or circuit) data connections. Also, the comparator processing scheme as currently employed prevents a single comparator from being utilized to support multiple simulcast channels simultaneously. As a result, in a multiple channel simulcast system architecture, there are currently an equal number of comparators required as there are radio communication channels to support information packet distribution.

Therefore, a need exists for a comparator device which can be coupled to an existing network infrastructure and which would make possible simulcast (timestamped) packet replication and distribution to associated transmitters on any given channel in a manner which removes the burden of packet replication from the comparator device itself.

DETAILED DESCRIPTION OF THE PREFERRED EMBODIMENTS

Generally, the present invention is directed to a packet non-replicating comparator device for use in a digital simulcast radio communication system which generates a single seed copy of a timestamped information data packet (per channel) for transmission to either a multicast capable packet-switched network, such as known local and wide area network (LAN/WAN) packet-switched communication systems, or to a packet duplicator coupled to a unicast capable packet-switched network.

For this purpose, the multicast capability of packet-switched networks is utilized to simplify the hardware and software complexity at the comparator site, by assigning the responsibility for performing simulcast (timestamped) packet replication and distribution (to the appropriate transmitters) to the coupled packet-switched network. As a result, the elimination of the comparator performed function of sourcing multiple (replicated) packets of a seed copy frees up valuable link bandwidth and processing power that may be used to support (sequentially source) the generation of multiple non-replicated packets corresponding to associated ones of multiple channels. The comparator construction described herein also allows using a single comparator device to provide information packet voting (and time stamping) for multiple simulcast channel operation.

Figure 1:
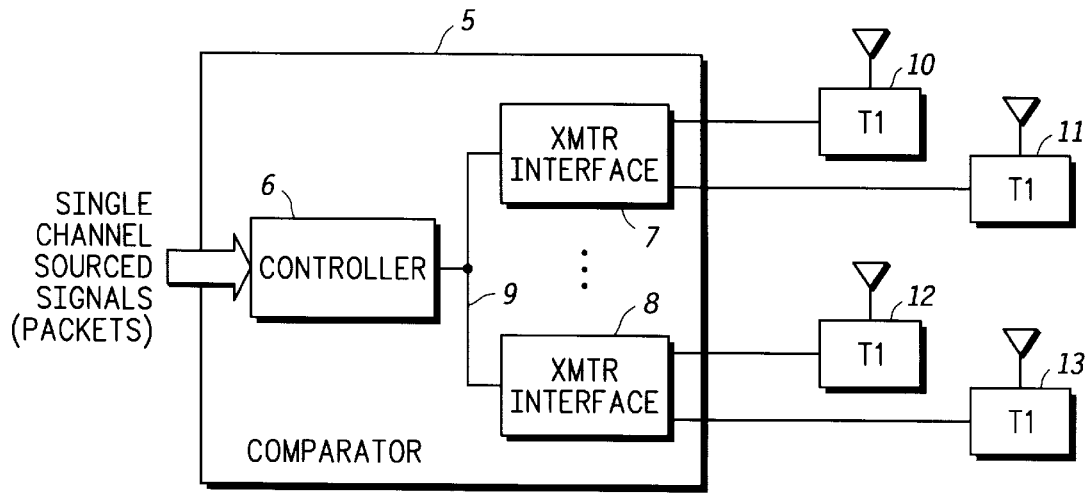
FIG. 1 illustrates a conventional single channel simulcast system provided with a dedicated single channel comparator.
Figure 2:
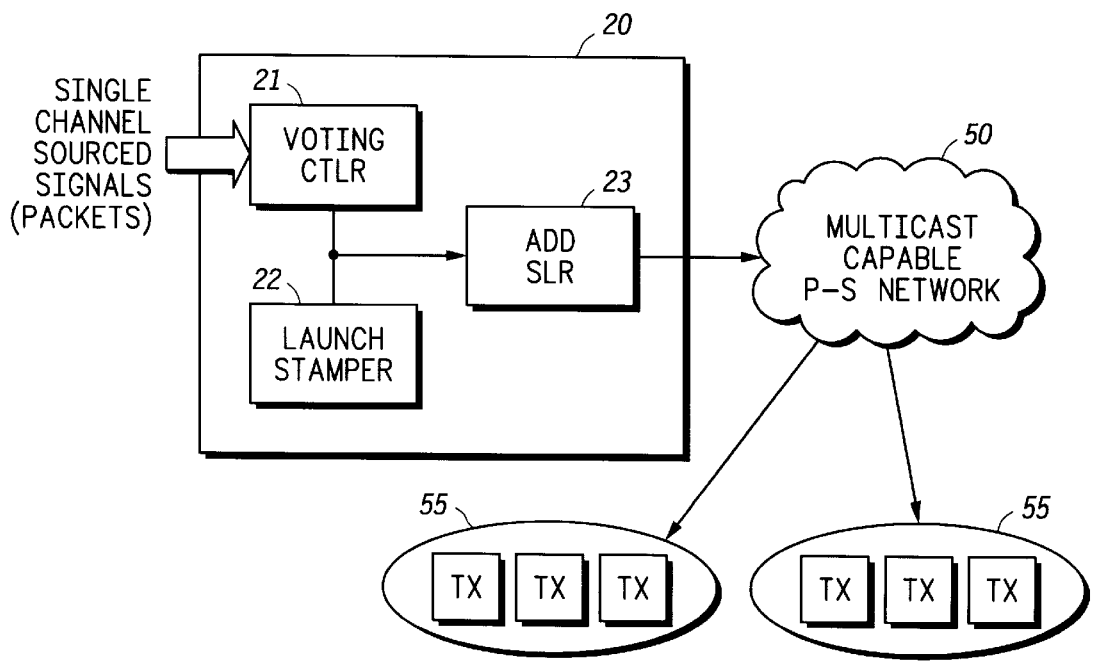
FIG. 2 illustrates a multiple channel simulcast system in accordance with a first preferred embodiment of the present invention employing a single comparator device coupled to a multicast capable packet-switched network for performing simulcast packet distribution.

The present invention can be more fully described with reference to FIGS. 2–4. FIG. 2 illustrates a block diagram depiction of a first embodiment of the present invention.

Referring to FIG. 2, there is shown a non-packet replicating comparator device 20 coupled to a multicast capable packet network 50 for performing simulcast packet distribution. The comparator device 20 receives a digital information data packet frame from each of a plurality of signal sources, such as base stations (not shown). Each packet frame is analyzed by the comparator device 20 which then determines, in a manner well known in the art, the best packet frame based on a comparison of the signal quality metrics of all the received packet frames.

The comparator device 20 comprises a simulcast/voting system controller 21 and a launch time stamper 22 which cooperate to generate a seed copy of a timestamped (voted) information data packet, in a manner to be described in more detail below. The seed copy, in turn, is addressed, using an address selector 23, to a group address associated with the simulcast transmitters 55 for a given channel on the multicast capable packet-switched network 50. Alternatively, the seed copy may also be addressed to a connection identifier assigned to a multicast permanent virtual circuit (PVC) (not shown) or switched virtual circuit (SVC) (not shown) as typically provided in a frame relay or asynchronous transfer mode (ATM) network environment. The packet-switched network 50 accepts the single seed copy of the timestamped packet and distributes it to the multiple transmitters 55 associated with the simulcast transmitters for the given channel. The network then performs the multicast service and delivers it to the targeted transmitters.

Figure 3:
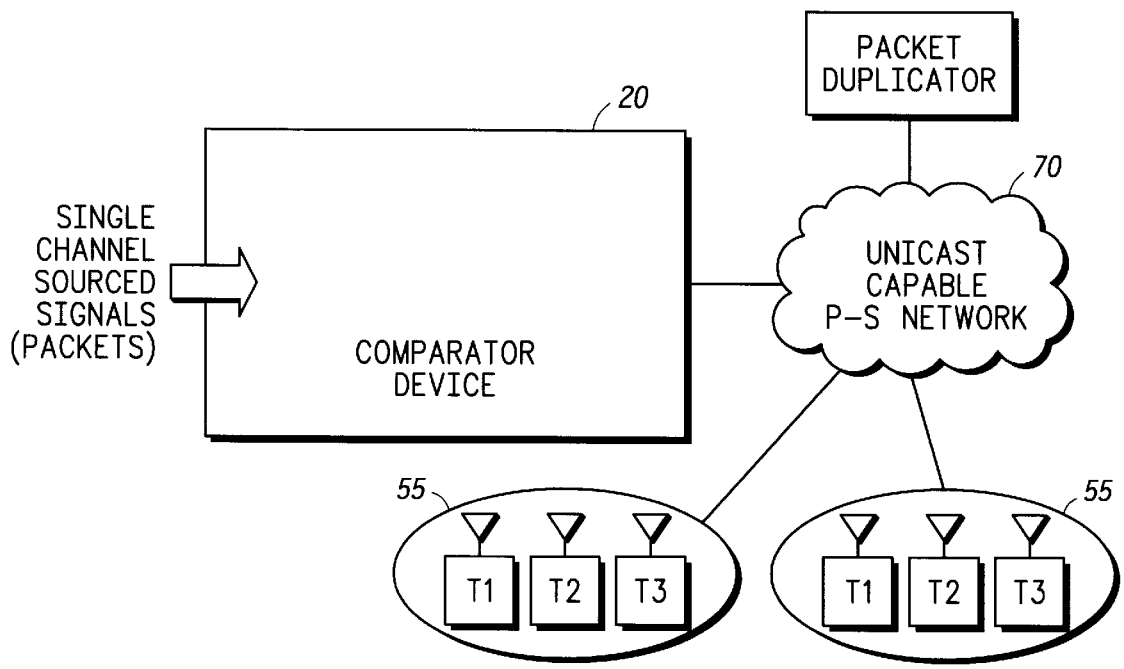
FIG. 3 illustrates a multiple channel simulcast system in accordance with a second preferred embodiment of the present invention employing a single comparator device coupled to a packet duplicator and a unicast capable packet-switched network for performing simulcast packet distribution.

In an alternative embodiment depicted in FIG. 3, the comparator device 20 seed copy is shown sourced to a packet duplicator 60 attached to a unicast capable packet network 70, such as Motorola's "iDEN" radio communication system. The packet duplicator 60 accepts the single seed copy of a timestamped data packet from the comparator device 20 and distributes it to the multiple transmitters associated with the simulcast channel. In this latter implementation, the comparator device 20 addresses the seed copy of the timestamped packet to the individual address of the packet duplicator 60 (or to a connection identifier assigned to a PVC or SVC) associated with the simulcast transmitters 55 for a given channel. The packet duplicator 60 performs the packet replication and delivers it to the targeted transmitters 55 using individually addressed packets.

The present invention, as implemented, avoids the need for employing independent circuit mode serial connections from the comparator to each transmitter on a given channel. The freed processing power of the comparator device 20 utilizes the multicast capable packet-switched network 50 (or the packet duplicator 60 in the second embodiment) to perform packet duplication of the timestamped simulcast message, hence relieving the comparator device 20 from this responsibility, as in prior art simulcast system architectures.

Moreover, because multiple (replicated) copies of the same information packet are no longer sourced by the comparator device 20, a savings of link bandwidth is realized at the comparator device 20 which can be utilized for processing, by a single comparator device, multiple information packets simultaneously in a multi-channel simulcast system environment, thus avoiding the need for multiple, parallel-configured comparators, resulting in significant cost savings and a reduction of total printed circuit board (PCB) real estate.

Figure 4:
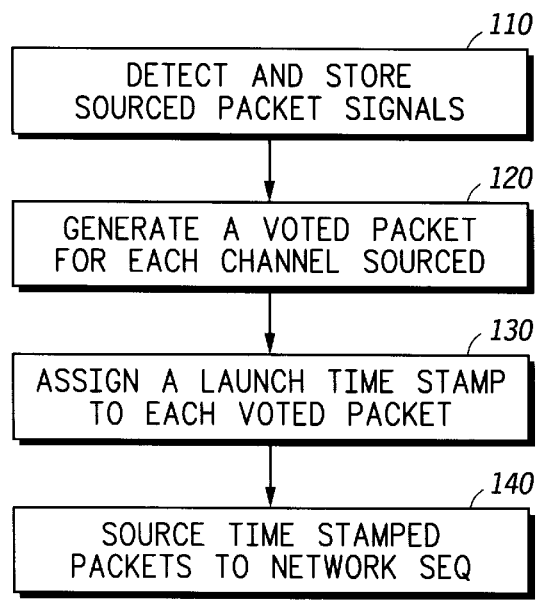
FIG. 4 illustrates an operational flow diagram of the comparator device of the present invention depicting the steps for generating a seed copy of a timestamped information data packet in accordance with the present invention.

Referring to FIG. 4, there will now generally be described the operational flow of the comparator device 20. The comparator device 20 initially receives one or more sets of information packets (110), each set corresponding to a given channel in a multi-channel environment. By definition, in a single channel simulcast system architecture, there is only one set of common information packets. In a multi-channel simulcast system architecture, the number of possible sets that may be processed/received at any point in time, either simultaneously or substantially simultaneously, by the comparator device 20 is equal to the maximum number of possible simulcast channels active at any time.

Each set of packets is analyzed by the simulcast/voting controller 21 and a best information (voted) packet for each set is determined using conventional signal quality metrics for data packet information streams (120).

A time stamp is determined (130) for the best information packet in each set that is to be used in later steps by the packet-switched network coupled transmitters 55 in each site to determine which received signals are to be compared and when they are to be transmitted.

Timestamping is performed by the launch time stamper 22 in a known manner and forms no part of this invention. The time stamp normally correlates the received signal with the time it was received (time of arrival). In the present exemplary embodiment, the time stamp represents a pre-calculated launch time for the eventual transmitted signal where the launch time is derived by adding a predetermined offset to the time of arrival. The predetermined offset is a constant that is chosen based on the expected worst case digital network transmission delay between any two sites.

It should be appreciated that for proper simulcast transmission, the packet-switched network coupled transmitters must have a replicated copy of the information packet to be transmitted (to the appropriately addressed transmitters in a buffer before the launch time.

As each 'best signal' information packet is timestamped by the launch time stamper 22, it is sourced (140) over a single LAN or WAN connection to the multicast capable packet switched network 50 (or the packet duplicator 60) where it will be replicated and sent for transmission by the transmitters associated with a given channel corresponding to the particular information packet. The single LAN or WAN connection may be either a wireline or a wireless connection and may be implemented using conventional packet mode internetworking or native packet-mode interfaces provided between the comparator device 20 and the corresponding packet-switched network device.

It should further be appreciated that the simulcast system architecture described herein, and including the comparator device 20, facilitates adding a LAN or WAN connection (not shown) to the multicast capable packet network 50 or to the unicast capable packet network 70, thus allowing multiple logical connections to be supported simultaneously on a single physical connection.

By utilizing the multicast capability of packet-switched networks to free up processing and bandwidth link time by the comparator device 20, as described herein, multi-channel connectivity to all network attached devices can be realized, thus providing new trunking (dynamic assignment) opportunities to available system resources.

Moreover, because a single physical packet-mode connection can support multiple logical connections, the sites are easier to install and maintain than the multi-cable circuit mode connections of prior art simulcast system architectures.

Finally, it should be appreciated that the disclosed methodology results in reduced aggregate bandwidth out of a comparator site, by a factor of Y×N, where Y is the number of transmitters on each simulcast channel and N is the number of simulcast channels supported by the comparator device 20.

While the present invention has been particularly shown and described with reference to particular embodiments thereof, it will be understood by those skilled in the art that various changes in form and details may be made therein without departing from the spirit and scope of the present invention.

We claim:

1. In combination, a packet non-replicating comparator device and a packet-switched network, the packet-switched network being adapted for replicating and distributing one or more timestamped packets sourced from the packet non-replicating comparator device to a plurality of simulcast transmitters, the packet non-replicating comparator device comprising:
   a voting controller, responsive to information packets received on one or more radio frequency (RF) channels, for generating a corresponding one or more voted packets;
   a launch time stamper for timestamping the one or more voted packets to form the one or more timestamped packets; and
   a bus for outputting the one or more timestamped packets to the packet-switched network via a single node connection.

2. The combination of claim 1, wherein said packet-switched network is a multicast capable packet-switched network.

3. The combination of claim 2, wherein said packet non-replicating comparator device further comprises an address selector, for selecting a multicast group address for each of the one or more timestamped packets.

4. The combination of claim 1, wherein said bus is a time division multiplexed (TDM) bus.

5. In combination, a packet non-replicating comparator device and a packet duplicator, the packet duplicator being adapted for replicating and distributing one or more timestamped packets sourced from the packet non-replicating comparator device to a plurality of simulcast transmitters, the packet non-replicating comparator device comprising:
   a voting controller, responsive to information packets received on one or more radio frequency (RF) channels, for generating a corresponding one or more voted packets;
   a launch time stamper for timestamping the one or more voted packets to form the one or more timestamped packets; and
   a bus for outputting the one or more timestamped packets to the packet duplicator via a single node connection.

6. The combination of claim 5, wherein said packet duplicator is coupled to a unicast capable packet-switched network.

7. The combination of claim 6, wherein said bus is a time division multiplexed (TDM) bus.

8. The combination of claim 5, wherein said bus is a time division multiplexed (TDM) bus.

9. A packet non-replicating comparator device for use in a multi-channel digital simulcast radio communication system of the type having a packet-switched network coupled to a first plurality of transmitters associated with a first radio frequency (RF) channel and a second plurality of transmitters associated with a second RF channel, the packet-switched network being responsive to a first timestamped packet and a second timestamped packet sequentially sourced from the comparator device over a single node connection for simulcasting the first and second timestamped packets to corresponding ones of the first and second pluralities of transmitters, the comparator device comprising:
   a voting controller, responsive to a first set of information packets received on the first RF channel and to a second set of information packets received on the second RF channel, for generating a first voted packet and a second voted packet, respectively;
   a launch time stamper for timestamping the first and second voted packets to form the first and second timestamped packets; and
   a bus for sequentially outputting the first and second timestamped packets to the packet-switched network via said single node connection.

10. The packet non-replicating comparator device of claim 9, wherein said packet-switched network is a multicast capable packet-switched network.

11. The packet non-replicating comparator device of claim 10, wherein said bus is a time division multiplexed (TDM) bus.

12. The packet non-replicating comparator device of claim 9, wherein said bus is a time division multiplexed (TDM) bus.

13. A packet non-replicating comparator device for use in a multi-channel digital simulcast radio communication system of the type having a packet duplicator coupled to a first plurality of transmitters associated with a first radio frequency (RF) channel and a second plurality of transmitters associated with a second RF channel, the packet duplicator being responsive to a first timestamped packet and a second timestamped packet sequentially sourced from the comparator device over a single node connection for simulcasting the first and second timestamped packets to corresponding ones of the first and second pluralities of transmitters, the comparator device comprising:
   a voting controller, responsive to a first set of information packets received on the first RF channel and to a second set of information packets received on the second RF channel, for generating a first voted packet and a second voted packet, respectively;

a launch time stamper for timestamping the first and second voted packets to form the first and second timestamped packets; and a bus for sequentially outputting the first and second timestamped packets to the packet duplicator via said single node connection.

14. The packet non-replicating comparator device of claim 13, wherein said packet duplicator is coupled to a unicast capable packet-switched network.

15. The packet non-replicating comparator device of claim 14, wherein said bus is a time division multiplexed (TDM) bus.

16. The packet non-replicating comparator device of claim 13, wherein said bus is a time division multiplexed (TDM) bus.

17. A method comprising:

receiving, by a single packet non-replicating comparator device, a plurality of information packets on each of N radio frequency (RF) channels, where N is an integer;

generating, by the packet non-replicating comparator device, a single voted packed from among the plurality of information packets on each of the N radio frequency channels, yielding N voted packets;

timestamping, by the packet non-replicating comparator device, the N voted packets with respective launch times, yielding N timestamped packets; and sending the N timestamped packets packet from the packet non-replicating comparator device to a means for replicating and distributing the N timestamped packets to one or more simulcast transmitters.

18. The method of claim 17 wherein the means for replicating and distributing the N timestamped packets comprises a multicast capable packet-switched network.

19. The method of claim 17 wherein the means for replicating and distributing the N timestamped packets comprises a packet duplicator and a unicast capable packet-switched network.

* * * * *

UNITED STATES PATENT AND TRADEMARK OFFICE
CERTIFICATE OF CORRECTION

PATENT NO.    : 6,137,796
DATED         : October 24, 2000
INVENTOR(S)   : Mario F. DeRango, et al.

It is certified that error appears in the above-identified patent and that said Letters Patent is hereby corrected as shown below:

<u>Claim 17,</u>
"packed" should be -- packet --

Signed and Sealed this

Second Day of October, 2001

Attest:

*Attesting Officer*

NICHOLAS P. GODICI
*Acting Director of the United States Patent and Trademark Office*